(12) United States Patent
Zhao

(10) Patent No.: US 11,558,479 B2
(45) Date of Patent: Jan. 17, 2023

(54) ACCESS METHOD, INTERNET OF THINGS PLATFORM, APPLICATION DEVICE, SERVICE DEVICE

(71) Applicant: BOE TECHNOLOGY GROUP CO., LTD., Beijing (CN)

(72) Inventor: Junjie Zhao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 41 days.

(21) Appl. No.: 17/041,413

(22) PCT Filed: Dec. 11, 2018

(86) PCT No.: PCT/CN2018/120257
§ 371 (c)(1),
(2) Date: Sep. 24, 2020

(87) PCT Pub. No.: WO2019/184443
PCT Pub. Date: Oct. 3, 2019

(65) Prior Publication Data
US 2021/0014321 A1    Jan. 14, 2021

(30) Foreign Application Priority Data
Mar. 30, 2018    (CN) .......................... 201810293164.6

(51) Int. Cl.
*H04L 67/52* (2022.01)
*G16Y 40/60* (2020.01)
(Continued)

(52) U.S. Cl.
CPC .............. *H04L 67/52* (2022.05); *G16Y 40/60* (2020.01); *H04L 67/141* (2013.01); *H04W 76/10* (2018.02)

(58) Field of Classification Search
CPC ...... H04L 67/18; H04L 67/141; H04W 76/10; G16Y 40/60
See application file for complete search history.

(56) References Cited

U.S. PATENT DOCUMENTS 11,188,904 B2 * 11/2021 Arora ................. G06Q 20/3227
2003/0134659 A1    7/2003 Morimoto
(Continued)

FOREIGN PATENT DOCUMENTS

| CN | 103442353 A | 12/2013 |
| CN | 104243406 A | 12/2014 |

(Continued)

OTHER PUBLICATIONS

ISA State Intellectual Property Office of the People's Republic of China, International Search Report and Written Opinion Issued in Application No. PCT/CN2018/120257, dated Feb. 27, 2019, WIPO, 12 pages. (Submitted with Partial Translation).

(Continued)

*Primary Examiner* — Matthew C Sams
(74) *Attorney, Agent, or Firm* — McCoy Russell LLP

(57) ABSTRACT

The present disclosure provides an access method, an internet of things platform, an application device and a service device. The access method applied to the internet of things platform includes: receiving an operation request message transmitted by an application device for accessing a service device, where the operation request message carries position information of the application device; determining whether the application device is capable of establishing connection with the service device according to the position information of the application device; when determining that the application device is capable of establishing connection with the service device, transmitting an operation response message carrying instruction information to the application device, (Continued)

where the instruction information is used to instruct the application device to access the service device.

8 Claims, 7 Drawing Sheets

(51) Int. Cl.
*H04L 67/141* (2022.01)
*H04W 76/10* (2018.01)

(56) References Cited

U.S. PATENT DOCUMENTS

| | | | |
|---|---|---|---|
| 2006/0194592 A1* | 8/2006 | Clough | G06Q 30/06 455/411 |
| 2013/0303160 A1* | 11/2013 | Fong | H04L 5/1469 455/426.1 |
| 2014/0185434 A1* | 7/2014 | Kim | H04L 41/0668 370/228 |
| 2014/0301289 A1* | 10/2014 | Johnsson | H04W 52/244 370/329 |
| 2015/0089070 A1 | 3/2015 | Attanasio et al. | |
| 2015/0319161 A1* | 11/2015 | Dimmick | G06Q 20/3224 726/4 |
| 2016/0227371 A1* | 8/2016 | Wang | H04W 4/70 |
| 2017/0195855 A1 | 7/2017 | Na et al. | |
| 2017/0250561 A1 | 8/2017 | Li et al. | |
| 2018/0068309 A1 | 3/2018 | Mahaffey et al. | |
| 2018/0192460 A1 | 7/2018 | Huh | |
| 2019/0057374 A1* | 2/2019 | Hernandez-Ellsworth | G06Q 20/409 |
| 2019/0068433 A1 | 2/2019 | Liu | |

FOREIGN PATENT DOCUMENTS

| | | | | |
|---|---|---|---|---|
| CN | 104486814 A | * | 4/2015 | ............ H04W 48/04 |
| CN | 106685891 A | | 5/2017 | |
| CN | 106973052 A | | 7/2017 | |
| CN | 107343022 A | | 11/2017 | |
| CN | 107358483 A | | 11/2017 | |
| CN | 107360601 A | * | 11/2017 | |
| CN | 107528733 A | | 12/2017 | |
| CN | 107852570 A | | 3/2018 | |
| CN | 109041072 A | * | 12/2018 | |
| JP | 2016537835 A | | 12/2016 | |
| KR | 20170082006 A | | 7/2017 | |
| WO | 02082852 A1 | | 10/2002 | |
| WO | 2016101418 A1 | | 6/2016 | |
| WO | 2017148155 A1 | | 9/2017 | |

OTHER PUBLICATIONS

State Intellectual Property Office of the People's Republic of China, Office Action and Search Report Issued in Application No. 201810293164.6, dated Aug. 31, 2021, 20 pages. (Submitted with Partial Translation).

European Patent Office, Extended European Search Report Issued in Application No. 18911638.7, dated Nov. 5, 2021, Germany, 12 pages.

Korean Intellectual Property Office, Office Action Issued in Application No. 10-2020-7030976, dated Mar. 18, 2022, 11 pages.

Japanese Patent Office, Office Action Issued in Application No. 2020-552705, dated Nov. 29, 2022, 8 pages.

* cited by examiner

ACCESS METHOD, INTERNET OF THINGS PLATFORM, APPLICATION DEVICE, SERVICE DEVICE

CROSS-REFERENCE TO RELATED APPLICATION

The present application is a U.S. National Phase of International Patent Application Serial No. PCT/CN2018/120257 entitled "ACCESS METHOD, INTERNET OF THINGS PLATFORM, APPLICATION DEVICE, SERVICE DEVICE," filed on Dec. 11, 2018. International Patent Application Serial No. PCT/CN2018/120257 claims priority to Chinese Patent Application No. 201810293164.6 filed on Mar. 30, 2018. The entire contents of each of the above-referenced applications are hereby incorporated by reference for all purposes.

TECHNICAL FIELD

The present disclosure relates to the field of internet of things technology, and in particular to an access method, an internet of things platform, an application device and a service device.

BACKGROUND AND SUMMARY

With the development of internet of things (IoT) technology, Machine to Machine (M2M) has been widely used. M2M can reduce human participation and improve automation degree of system.

Currently, there are two main communication modes for M2M: indirect interconnection through the internet of things platform, or direct interconnection. One machine that initiates a request is referred as an application device, and one machine that provides service is referred as a service device.

In actual situations of IoT applications, one application device may be authorized by the IoT platform to use one service device to which the one application device cannot access, and this may bring some inconvenience to the system. Further, some application devices may access to service devices illegally, resulting in resource loss.

One embodiment of the present disclosure provides an access method applied to an internet of things (Iot) platform, including:

receiving an operation request message transmitted by an application device for accessing a service device; wherein the operation request message carries position information of the application device;

determining whether the application device is capable of establishing connection with the service device according to the position information of the application device;

when determining that the application device is capable of establishing connection with the service device, transmitting an operation response message carrying instruction information to the application device; wherein the instruction information is used to instruct the application device to access the service device.

Before the determining whether the application device is capable of establishing connection with the service device, the method further includes: receiving position information of the service device transmitted by the service device. The determining whether the application device is capable of establishing connection with the service device according to the position information of the application device, includes: determining whether the application device is capable of establishing connection with the service device according to the position information of the application device and the position information of the service device.

The determining whether the application device is capable of establishing connection with the service device according to the position information of the application device and the position information of the service device, includes:

according to the position information of the application device and the position information of the service device, determining a distance between the application device and the service device and/or an angle defined between a connection line of the application device and the service device and a preset axis;

when the distance is less than or equal to a distance threshold, and/or, the angle is less than or equal to an angle threshold, determining that the application device is capable of establishing connection with the service device; otherwise, determining that the application device is not capable of establishing connection with the service device.

The determining whether the application device is capable of establishing connection with the service device according to the position information of the application device, includes:

forwarding the operation response message to the service device, thereby enabling the service device to determine whether the application device is capable of establishing connection with the service device according to the position information of the application device in the operation request message;

receiving an operation response message transmitted by the service device; when the operation response message carries instruction information for instructing the application device to access the service device, determining that the application device is capable of establishing connection with the service device;

wherein the transmitting an operation response message carrying instruction information to the application device, includes: forwarding the operation response message received from the service device to the application device.

According to another aspect, one embodiment of the present disclosure provides an access method applied to an application device, including:

when access to the service device is required, transmitting an operation request message to an internet of things (IoT) platform; wherein the operation request message carries position information of the application device;

receiving an operation response message transmitted by the IoT platform;

when the operation response message carries instruction information required by the application device to access the service device, accessing the service device according to the instruction information.

The access method further includes:

receiving a connection request message which is transmitted by the service device when the service device receives the operation request message forwarded by the IoT platform;

transmitting a connection response message to the service device; wherein the connection response message is used to indicate whether the service device successfully establishes connection with the application device according to the connection request message.

In addition, one embodiment of the present disclosure provides an access method applied to a service device, including: providing local resources to an application device when the application device accesses the service device.

The access method further includes: transmitting position information of the service device to an internet of things (IoT) platform, thereby enabling the IoT platform to determine whether the application device is capable of establishing connection with the service device according to position information of the application device and the position information of the service device.

The access method further includes:

receiving an operation request message forwarded by an internet of things (IoT) platform; wherein the operation request message carries position information of the application device;

transmitting a connection request message to the application device according to the position information of the application device;

receiving a connection response message transmitted by the application device;

wherein the connection response message is used to indicate whether the service device successfully establishes connection with the application device according to the position information of the application device;

when the connection response message indicates that the service device successfully establishes connection with the application device according to the position information of the application device, transmitting an operation response message carrying instruction information to the IoT platform; wherein the instruction information is used to instruct the application device to access the service device.

The access method further includes:

receiving an operation request message forwarded by an internet of things (IoT) platform; wherein the operation request message carries the position information of the application device;

determining whether the application device is capable of establishing connection with the service device according to the position information of the application device and the position information of the service device;

when the application device is capable of establishing connection with the service device, transmitting an operation response message to the IoT platform; wherein the operation response message carries instruction information which is used to instruct the application device to access the service device.

The determining whether the application device is capable of establishing connection with the service device according to the position information of the application device and the position information of the service device, includes:

according to the position information of the application device and the position information of the service device, determining a distance between the application device and the service device and/or an angle defined between a connection line of the application device and the service device and a horizontal plane;

when the distance is less than or equal to a distance threshold, and/or, the angle is less than or equal to an angle threshold, determining that the application device is capable of establishing connection with the service device; otherwise, determining that the application device is not capable of establishing connection with the service device.

In addition, one embodiment of the present disclosure provides an internet of things (IoT) platform including:

a first receiving circuit configured to receive an operation request message transmitted by an application device for accessing a service device; wherein the operation request message carries position information of the application device;

a first processing circuit configured to determine whether the application device is capable of establishing connection with the service device according to the position information of the application device;

a first transmitting circuit configured to, when determining that the application device is capable of establishing connection with the service device, transmit an operation response message carrying instruction information to the application device; wherein the instruction information is used to instruct the application device to access the service device.

The IoT platform further includes: a second receiving circuit configured to, before determining whether the application device is capable of establishing connection with the service device, receive position information of the service device transmitted by the service device; the first processing circuit includes: a first processing sub-circuit configured to determine whether the application device is capable of establishing connection with the service device according to the position information of the application device and the position information of the service device.

The first processing sub-circuit is specifically configured to, according to the position information of the application device and the position information of the service device, determine a distance between the application device and the service device and/or an angle defined between a connection line of the application device and the service device and a preset axis; when the distance is less than or equal to a distance threshold, and/or, the angle is less than or equal to an angle threshold, determine that the application device is capable of establishing connection with the service device; otherwise, determining that the application device is not capable of establishing connection with the service device.

The first processing circuit further includes a second processing sub-circuit configured to, forward the operation response message to the service device, thereby enabling the service device to determine whether the application device is capable of establishing connection with the service device according to the position information of the application device in the operation request message;

receive an operation response message transmitted by the service device; when the operation response message carries instruction information for instructing the application device to access the service device, determine that the application device is capable of establishing connection with the service device;

wherein the first transmitting circuit is configured to forward the operation response message received from the service device to the application device.

In addition, one embodiment of the present disclosure provides an application device including:

a second transmitting circuit configured to, when access to the service device is required, transmit an operation request message to an internet of things (IoT) platform; wherein the operation request message carries position information of the application device;

a third receiving circuit configured to receive an operation response message transmitted by the IoT platform;

an access circuit configured to, when the operation response message carries instruction information required by the application device to access the service device, access the service device according to the instruction information.

The application device further includes:

a fourth receiving circuit configured to receive a connection request message which is transmitted by the service device when the service device receives the operation request message forwarded by the IoT platform;

a third transmitting circuit configured to transmit a connection response message to the service device; wherein the connection response message is used to indicate whether the service device successfully establishes connection with the application device according to the connection request message.

In addition, one embodiment of the present disclosure provides a service device including: a resource providing circuit configured to provide local resources to an application device when the application device accesses the service device.

The service device further includes: a fourth transmitting circuit configured to transmit position information of the service device to an internet of things (IoT) platform, thereby enabling the IoT platform to determine whether the application device is capable of establishing connection with the service device according to position information of the application device and the position information of the service device.

The service device further includes:

a fifth receiving circuit configured to receive an operation request message forwarded by an internet of things (IoT) platform; wherein the operation request message carries position information of the application device;

a fifth transmitting circuit configured to transmit a connection request message to the application device according to the position information of the application device;

a sixth receiving circuit configured to receive a connection response message transmitted by the application device; wherein the connection response message is used to indicate whether the service device successfully establishes connection with the application device according to the position information of the application device;

a sixth transmitting circuit configured to, when the connection response message indicates that the service device successfully establishes connection with the application device according to the position information of the application device, transmitting an operation response message carrying instruction information to the IoT platform; wherein the instruction information is used to instruct the application device to access the service device.

The service device further includes:

a seventh receiving circuit configured to receive an operation request message forwarded by an internet of things (IoT) platform; wherein the operation request message carries the position information of the application device;

a second processing circuit configured to determine whether the application device is capable of establishing connection with the service device according to the position information of the application device and the position information of the service device;

a seventh transmitting circuit configured to, when the application device is capable of establishing connection with the service device, transmit an operation response message to an internet of things (IoT) platform; wherein the operation response message carries instruction information which is used to instruct the application device to access the service device.

The second processing circuit is configured to, according to the position information of the application device and the position information of the service device, determine a distance between the application device and the service device and/or an angle defined between a connection line of the application device and the service device and the horizontal plane;

when the distance is less than or equal to a distance threshold, and/or, the angle is less than or equal to an angle threshold, determine that the application device is capable of establishing connection with the service device; otherwise, determine that the application device is not capable of establishing connection with the service device.

In addition, one embodiment of the present disclosure provides a computer device, including: a processor, a memory, and a computer program stored on the memory and executable on the processor; wherein the computer program is executed by the processor to implement the access method applied to the IoT platform in the above embodiments, or implement the access method applied to the application device in the above embodiments, or implement the access method applied to the service device in the above embodiments.

In addition, one embodiment of the present disclosure provides a computer-readable storage medium including a computer program stored thereon; wherein the computer program is executed by a processor to implement steps of the access method applied to the IoT platform in the above embodiments, or implement steps of the access method applied to the application device in the above embodiments, or implement steps of the access method applied to the service device in the above embodiments.

DETAILED DESCRIPTION

In order to make technical problems to be solved, technical solutions and the advantages of the present disclosure more apparent, the present disclosure will be described hereinafter in a clear and complete manner in conjunction with the drawings and embodiments. In the following description, specific configurations and specific details of components are provided only to assist in a comprehensive understanding of the embodiments of the present disclosure. Therefore, those skilled in the art should understand that various changes and modifications may be made to the embodiments described herein without departing from the scope and spirit of the present disclosure. In addition, descriptions of known functions and configurations are omitted for clarity and conciseness.

It should be understood that "an embodiment" or "one embodiment" mentioned throughout the specification means that specific features, structures or characteristics related to one embodiment are included in at least one embodiment of the present disclosure. Therefore, "in an embodiment" or "in one embodiment" appearing throughout the specification does not necessarily refer to the same embodiment. In addition, these specific features, structures or characteristics may be combined in any suitable manner in one or more embodiments.

In various embodiments of the present disclosure, it should be understood that sequence numbers of the following procedures do not mean execution orders, and execution orders of various procedures should be determined by their functions and inherent logic, and therefore the sequence numbers of the following procedures should not constitute any limitation on implementation process of the embodiments of the present disclosure.

The embodiments of the present disclosure provide solutions to the problem that the internet of things platform may provide a user with a use authorization of a service device which cannot be accessed.

Figure 1:
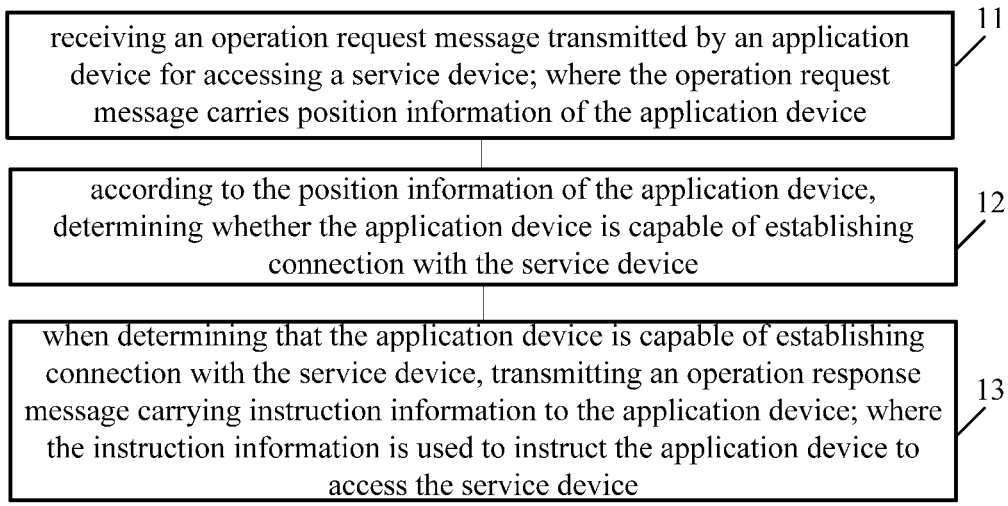
FIG. 1 is a flowchart of an access method applied to an internet of things platform according to some embodiments of the present disclosure.

According to one aspect, one embodiment of the present disclosure provides an access method, which is applied to an internet of things (IoT) platform. As shown in FIG. 1, the access method includes the following steps 11-13.

Step 11: receiving an operation request message transmitted by an application device for accessing a service device; where the operation request message carries position information of the application device.

The above-mentioned application device may be a smart terminal of a user or an administrator, such as a mobile phone, a PAD, a notebook computer. The position information may be provided by positioning function of the smart terminal. The above service device may be a vending machine, a self-service camera, a shared application device. The present disclosure does not limit specific operations of the application device to the service device according to the operation request message, for example, a user equipment may request for accessing the service device to use resources of the service device, or an administrator device may request for accessing the service device to update and configure the service device.

Step 12: according to the position information of the application device, determining whether the application device is capable of establishing connection with the service device.

The service device can be provided by the IoT platform to users only after the service device has completed relevant registration on the IoT platform. Thus, the status of the service device can be known in advance, and then it can be determined whether the application device is capable of establishing connection with the service device according to the position information of the application device.

Step 13: when it is determined that the application device is capable of establishing connection with the service device, transmitting an operation response message carrying instruction information to the application device; where the instruction information is used to instruct the application device to access the service device.

Transmission mechanism of the operation response message is not limited in the present disclosure.

For example, the IoT platform transmits the operation response message to the application device only when the IoT platform accepts the operation request message transmitted by the application device, and then the application device can directly access the service device according to the instruction information in the operation response message. Or, the IoT platform feeds back an operation response message to the application device no matter whether the IoT platform accepts the operation request message transmitted by the application device. When the IoT platform accepts the operation request message transmitted by the application device, the instruction information is carried in the operation response message to instruct the application device to access the service device. When the IoT platform does not accept the operation request message transmitted by the application device, the instruction information is not encapsulated into the operation response message to indicate rejection to the application device (the operation response message indicating rejection may further carry a rejection reason). For another example, the IoT platform enables the service device to determine whether the application device is capable of establishing connection with the service device according to the position information of the application device, then the operation response message is initiated by the service device and then the IoT platform is only responsible for forwarding the operation response message to the application device.

In the solution of this embodiment, the IoT platform can obtain the position information of the application device, and then determine whether the application device is capable of establishing connection with the service device according to the position information. Only when it is determined that the application device is capable of establishing connection with the service device, the IoT platform transmits to the application device the instruction information for instructing access to the service device. In practical applications, the solution of this embodiment can avoid the situation that the IoT platform allocates unusable resources to the user, thereby improving the user experience for the IoT platform. In addition, since the solution of this embodiment can provide resources of the service device to application devices at reasonable positions, to a certain extent, it can prevent one application device from illegally accessing the service device to obtain resources of the service device.

The access method of this embodiment is described hereinafter in details.

In one embodiment, after obtaining the position information of the application device, the IoT platform can determine whether the application device is capable of establishing connection with the service device in two manners.

One manner to determine whether the application device is capable of establishing connection with the service device includes: comparing, by the IoT platform, a position of the application device with a position of the service device to determine whether the application device is capable of establishing connection with the service device.

Specifically, before performing the above step 12, the access method of one embodiment further includes the following steps: receiving, by the IoT platform, position information of the service device transmitted by the service device.

The IoT platform may actively instruct the service device to report the position information of the service device, or, the service device may actively report its position information to the IoT platform according to a pre-agreement.

Correspondingly, when performing the step 12, the IoT platform specifically determines whether the application device is capable of establishing connection with the service device according to the position information of the application device and the position information of the service device.

As an exemplary illustration, in the access method of one embodiment, according to the position information of the application device and the position information of the service device, a distance between the application device and the service device and/or an angle defined between a connection line of the application device and the service device and the horizontal plane, may be first determined. Then, whether the application device is capable of establishing connection with the service device is determined according to the above distance and/or angle.

In practical applications, in one embodiment, a distance threshold and an angle threshold may be determined according to an access mode of the user equipment and the service device (for example, when one user equipment is connected with the service device by Bluetooth, a distance threshold and an angle threshold may be determined according to interaction ability of Bluetooth).

When the distance between the application device and the service device does not exceed the distance threshold and/or the angle between the application device and the service device does not exceed the angle threshold, it can be determined that the application device at its position is capable of establishing connection with the service device.

Another manner to determine whether the application device is capable of establishing connection with the service device includes: triggering, by the IoT platform, the service device to determine whether the application device is capable of establishing connection with the service device.

That is, the IoT platform may directly forward the operation request message to the service device, and then the service device determines whether the application device is capable of establishing connection with the service device according to the position information of the application device in the operation request message. Then, the IoT platform receives an operation response message transmitted by the service device. When the application device is capable of establishing connection with the service device, the operation response message carries the instruction information for instructing the application device to access the service device. Thus, the IoT platform determines whether the application device is capable of establishing connection with the service device according to whether the operation response message carries the instruction information for instructing the application device to access the service device. When the operation response message carries the instruction information for instructing the application device to access the service device, the IoT platform can determine that the application device is capable of establishing connection with the service device.

Correspondingly, when performing the above step 13, the IoT platform forwards the operation response message received from the service device to the application device.

After the application device receives the operation response message, the application device can determine whether the application device is capable of establishing connection with the service device in two manners.

A first manner is that the application device determines whether it is capable of establishing connection with the service device according to the position information of the application device itself and the position information of the service device.

A second manner is that the service device attempts to establish connection with the application device; when the connection is established successfully, the service device determines that the service device is capable of establishing connection with the application device.

Apparently, in the second manner, if the service device can actively connect to the application device, it indicates that the application device can also actively connect to the service device. Thus, based on this judgment mechanism, the success rate of configuring by the IoT platform available service devices for user equipment can be greatly improved.

In addition, in one embodiment, after receiving the operation request message, the IoT platform may first determine whether the application device is capable of establishing connection with the service device according to the position information of the application device and the position information of the service device. After the IoT platform determines that the application device is capable of establishing connection with the service device, the IoT platform may forward the operation request message to the service device, and then the service device further determines whether the application device is capable of establishing connection with the service device. When the service device further determines that the application device is capable of establishing connection with the service device, the service device feeds back an operation response message to the IoT platform.

Figure 2:
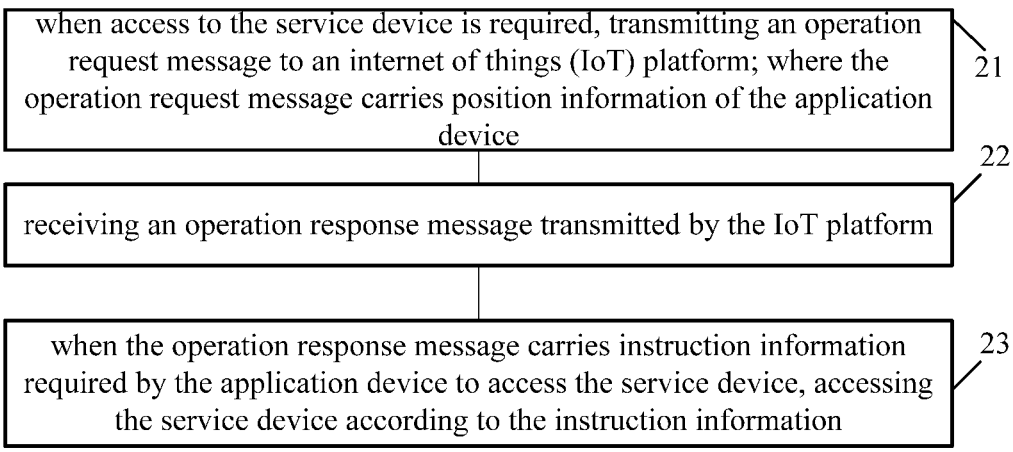
FIG. 2 is a flowchart of an access method applied to an application device according to some embodiments of the present disclosure.

Correspondingly, one embodiments of the present disclosure further provides an access method applied to an application device. As shown in FIG. 2, the access method includes the following steps 21-23.

Step 21: when access to the service device is required, transmitting an operation request message to an internet of things (IoT) platform; where the operation request message carries position information of the application device.

Step 22: receiving an operation response message transmitted by the IoT platform.

Step 23: when the operation response message carries instruction information required by the application device to access the service device, accessing the service device according to the instruction information.

The application device may directly access the service device, or, indirectly access the service device through the IoT platform.

In the access method of one embodiment, when the user requests for resources of the service device from the IoT platform, the application device actively reports its position information, so that the IoT platform can use the position information to determine whether the application device is capable of establishing connection with the service device. Only when it is determined that the application device is capable of establishing connection with the service device, the IoT platform transmits to the application device the instruction information for instructing access to the service device. In practical applications, the solution of this embodiment can avoid the situation that the IoT platform allocates unusable resources to the user, thereby improving the user experience for the IoT platform.

The access method applied to the application device of one embodiment is described hereinafter in details.

Specifically, the IoT platform may transmit the received position information of the application device to the service device, and then the service device attempts to establish connection with the application device in advance according to the position information of the application device. The IoT platform determines whether the application device is capable of establishing connection with the service device according to a result of the service device attempting to establish connection with the application device.

Therefore, in one embodiment, when the application device receives a request from the service device to establish connection, if the connection is successfully established, the application device feeds back successful connection to the service device, so that the service device notifies the IoT platform of the result of the service device attempting to establish connection with the application device. Thus, the access method of one embodiment further includes the following steps 24-25.

Step 24: receiving, by the application device, a connection request message which is transmitted by the service device according to a connection command message from the IoT platform.

Step 25: transmitting, by the application device, a connection response message to the service device; where the connection response message is used to indicate whether the service device successfully establishes connection with the application device according to the connection request message.

In actual applications, the application device may not accept the connection request from the service device due to some reasons. The application device may inform the service device of connection failure through the connection response message carrying reasons of the connection failure. Then the service device forwards reason of the connection failure to the IoT platform. Subsequently, the IoT platform may further display the reason of the connection failure to the user of the application device, and then the user may further perform related processing operation.

Apparently, based on the above method, the user of the application device can clearly know which service devices are available and which service devices are not available through the IoT platform. The solution of this embodiment can significantly improve user experience.

Figure 3:
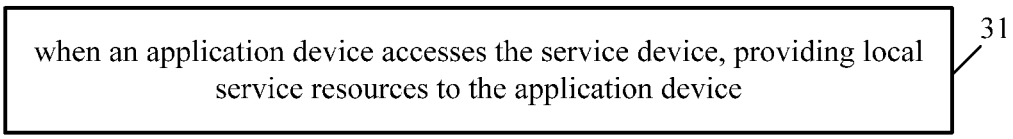
FIG. 3 is a flowchart of an access method applied to a service device according to some embodiments of the present disclosure.

In addition, one embodiments of the present disclosure further provides an access method applied to a service device. As shown in FIG. 3, the access method includes: step 31: when an application device accesses the service device, providing local service resources to the application device.

Only when the IoT platform determines that the application device is capable of establishing connection with the service device according to the position information of the application device, the IoT platform transmits to the application device the instruction information for instructing access to the service device. The application device can access the service device only based on the instruction information.

The solution of this embodiment can prevent the IoT platform from allocate unusable service device resources to the user.

Apparently, the access method applied to the service device of this embodiment corresponds to the above access method applied to the IoT platform and the access method applied to the application device, and thus all three access methods can achieve the same technical effect.

Specifically, the IoT platform may compare a position of the application device with a position of the service device to determine whether the application device is capable of establishing connection with the service device.

Therefore, the access method of one embodiment further includes:

Step 32: transmitting, by the service device, position information of the service device to the IoT platform, thereby enabling the IoT platform to determine whether the application device is capable of establishing connection with the service device according to position information of the application device and the position information of the service device.

In practical applications, the above position information of the service device may be reported to the IoT platform by the service device in response to a command of the IoT platform; or, it may be actively reported by the service device to the IoT platform according to a certain pre-agreement; or, it may be reported by the service device when the service device registers into the IoT platform.

In addition, the IoT platform may forward the received operation request message to the service device, and then the service device determines whether the application device is capable of establishing connection with the service device and feeds back an operation response message.

As one of feasible implementation solutions, the access method in one embodiment further includes the following steps 33-36.

Step 33: receiving an operation request message forwarded by the IoT platform, where the operation request message carries the position information of the application device.

Step 34: transmitting a connection request message to the application device according to the position information of the application device.

Step 35: receiving a connection response message transmitted by the application device; where the connection response message is used to indicate whether the service device successfully establishes connection with the application device according to the position information of the application device.

Step 36: when the connection response message indicates that the service device successfully establishes connection with the application device according to the position information of the application device, transmitting an operation response message carrying instruction information to the IoT platform; where the instruction information is used to instruct the application device to access the service device.

Based on the above implementation solution, the service device attempts to establish connection with the application device in advance according to the position information of the application device, and then the IoT platform determines whether the application device is capable of establishing connection with the service device according to a result of the service device attempting to establish connection with the application device. Apparently, if the service device can actively connect to the application device, it indicates that the application device can also actively connect to the service device. Thus, based on this judgment mechanism, the success rate of configuring by the IoT platform available service device resources for user equipment can be greatly improved.

As another one of feasible implementation solutions, the access method in one embodiment further includes the following steps 37-39.

Step 37: receiving an operation request message forwarded by the IoT platform, where the operation request message carries the position information of the application device.

Step 38: determining whether the application device is capable of establishing connection with the service device according to the position information of the application device and the position information of the service device.

Step 39: when the application device is capable of establishing connection with the service device, transmitting an operation response message to the IoT platform; where the operation response message carries instruction information which is used to instruct the application device to access the service device.

When performing the step 38, according to the position information of the application device and the position information of the service device, a distance between the application device and the service device and/or an angle defined between a connection line of the application device and the service device and the horizontal plane, may be determined. When the distance is less than or equal to a distance threshold, and/or, the angle is less than or equal to an angle threshold, it is determined that the application device is capable of establishing connection with the service device; otherwise, it is determined that the application device is not capable of establishing connection with the service device.

Practical applications of the access method of the present disclosure will be described hereinafter in details in conjunction with the IoT platform, the application device and the service device.

First Practical Application

Figure 4:
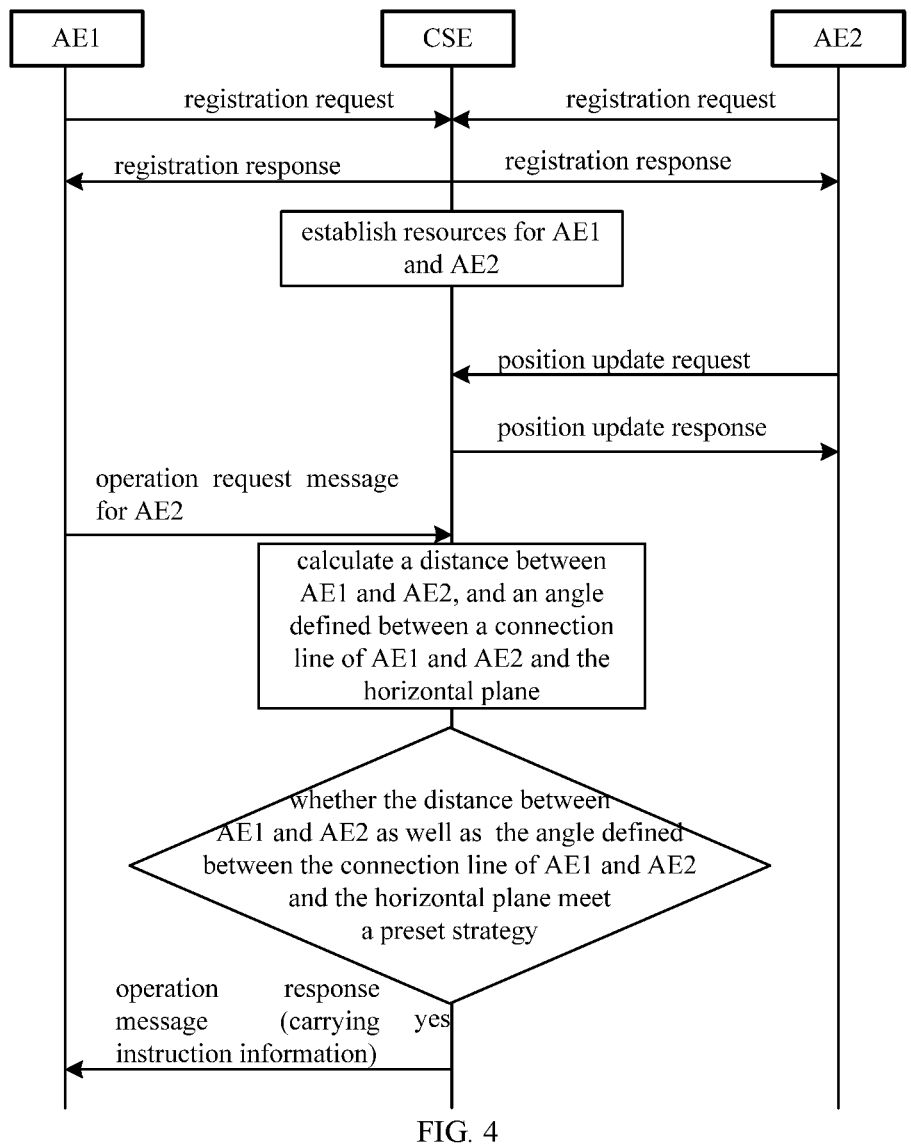
FIG. 4 is a flowchart of an access method in a first practical application according to some embodiments of the present disclosure.

As shown in FIG. 4, the access method of this first practical application includes:

an application device AE1 and a service device AE2 respectively initiate registration requests to an IoT platform CSE for initiating registration procedures at the CSE; the CSE feeds back registration responses to AE1 and AE2, respectively, so that AE1 and AE2 complete the registration; and the CSE locally establishes resources for AE1 and AE2;

AE2 initiates a position update request to CSE and transmits current position information of AE2 to CSE; after CSE records the position information of AE2, CSE feeds back a position update response to AE2, thereby completing procedures of updating position of AE2 on CSE;

when AE1 needs to use the resources of AE2, AE1 initiates an operation request message for AE2 to the CSE, where the operation request message carries position information of AE1;

according to the position information of AE1 and AE2, CSE calculates a distance between AE1 and AE2, and an angle defined between a connection line of AE1 and AE2 and the horizontal plane;

CSE determines whether the distance between AE1 and AE2 as well as the angle defined between the connection line of AE1 and AE2 and the horizontal plane meet a preset strategy (for example, whether the distance between AE1 and AE2 exceeds a distance threshold, and whether the angle defined between the connection line of AE1 and AE2 and the horizontal plane exceeds an angle threshold); when the preset strategy is met, CSE transmits an operation response message carrying instruction information to AE1. Subsequently, AE1 accesses AE2 according to the instruction information (AE1 directly accesses AE2 or indirectly accesses AE2 through the CSE), and uses service resources of AE2.

Second Practical Application

Figure 5:
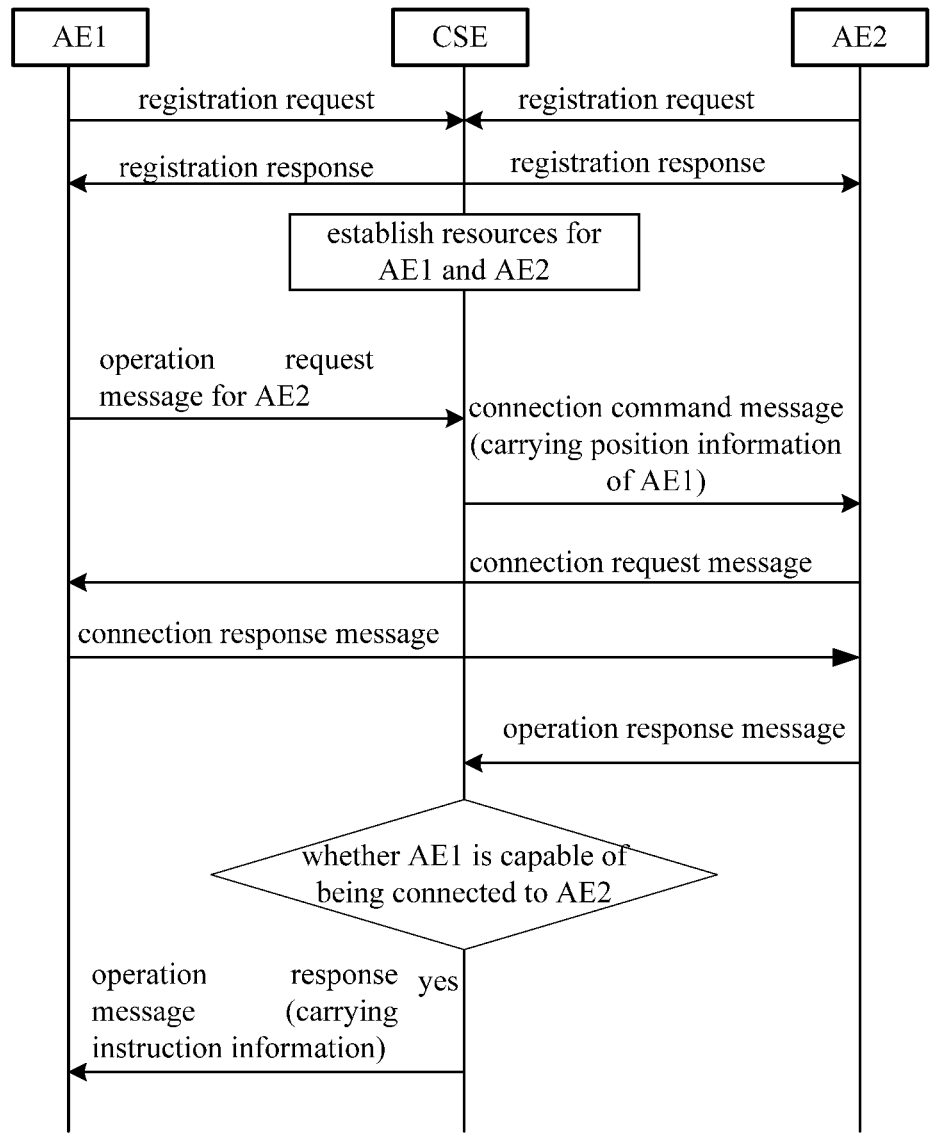
FIG. 5 is a flowchart of an access method in a second practical application according to some embodiments of the present disclosure.

As shown in FIG. 5, the access method of this second practical application includes:

an application device AE1 and a service device AE2 respectively initiate registration requests to an IoT platform CSE for initiating registration procedures at the CSE; the CSE feeds back registration responses to AE1 and AE2, respectively, so that AE1 and AE2 complete the registration; and the CSE locally establishes resources for AE1 and AE2;

when AE1 needs to use the resources of AE2, AE1 initiates an operation request message for AE2 to the CSE, where the operation request message carries position information of AE1;

CSE transmits a connection command message carrying the position information of AE1 to AE2;

AE2 attempts to establish connection with AE1 according to the position information of AE1, and transmits a connection request message to AE1;

AE1 feeds back a connection response message to AE2 according to the connection request message;

AE2 determines whether it successfully establishes connection with AE1 according to the connection response message, and transmits an operation response message to CSE to indicate whether AE2 successfully establishes connection with AE1; where AE2 encapsulates instruction information for instructing AE1 to access AW2 in the operation response message when AE2 successfully establishes connection with AE1;

CSE determines whether AE1 is capable of being connected to AE2 according to whether the operation response message from AE2 carries instruction information;

when it is determined that AE1 is capable of being connected to AE2, CSE transmits an operation response message carrying instruction information to AE1. Subsequently, AE1 accesses AE2 according to the instruction information and uses service resources of AE2.

On the basis of the above, this second practical application may also be appropriately changed.

For example, when AE2 transmits to CSE a connection command response message for indicating that AE2 is capable of successfully establishing connection with AE1, then when CSE receives the connection command response message, CSE may further determine whether AE1 and AE2 meet a preset strategy according to position information of AE1 and position information of AE2 in the same way as in the first practical application (for example, whether the distance between AE1 and AE2 exceeds a distance threshold, and whether the angle defined between the connection line of AE1 and AE2 and the horizontal plane exceeds an angle threshold). When the preset strategy is met, then CSE transmits an operation response message carrying instruction information to AE1; otherwise, CSE executes procedures of rejecting AE1 to access AE2.

The connection command response message may carries the position information of AE2, that is, CSE can obtain the position information of AE2 through the connection command response message.

For another example, when CSE receives the operation request message for AE2 transmitted by AE1, the CSE first determines whether AE1 and AE2 meet a preset strategy according to position information of AE1 and position information of AE2 in the same way as in the first practical application (for example, whether the distance between AE1 and AE2 exceeds a distance threshold, and whether the angle defined between the connection line of AE1 and AE2 and the horizontal plane exceeds an angle threshold). When the preset strategy is met, then CSE transmits a connection command message to AE2; otherwise, CSE determines that AE1 is unable to be connected with AE2 and executes procedures of rejecting AE1 to access AE2.

Third Practical Application

Figure 6:
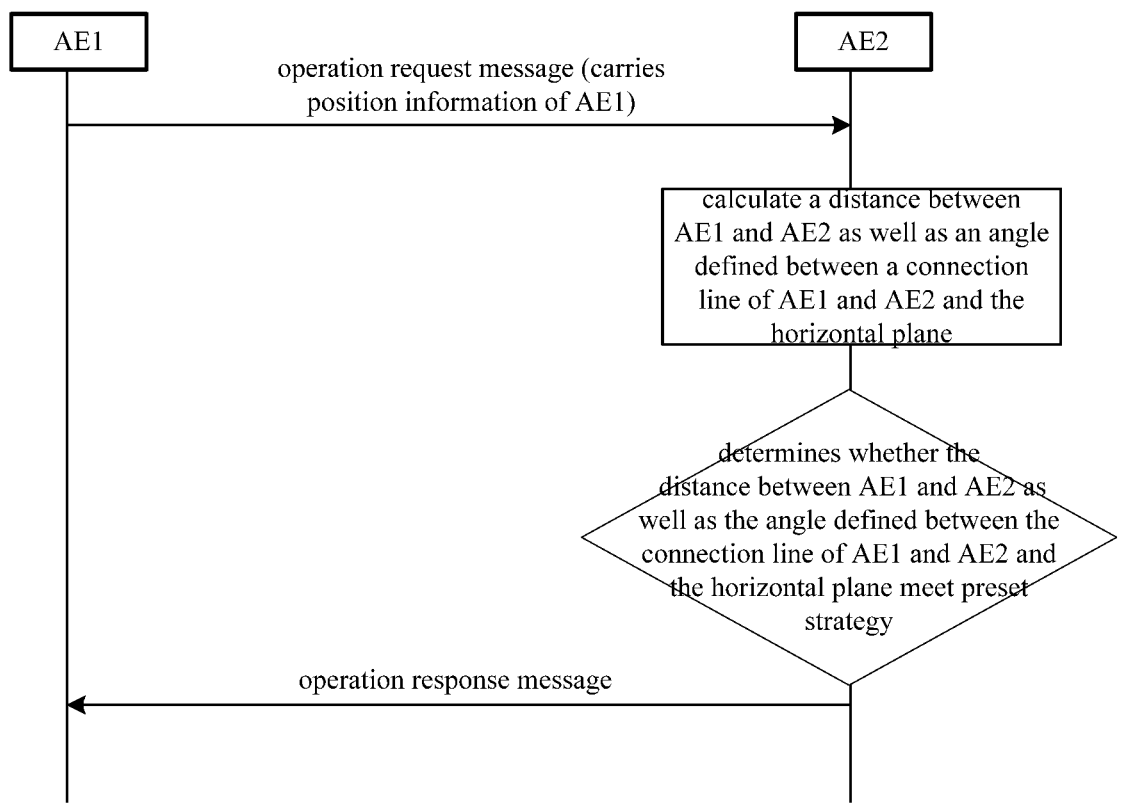
FIG. 6 is a flowchart of an access method in a third practical application according to some embodiments of the present disclosure.

In the third practical application, AE1 can access AE2 without CSE. As shown in FIG. 6, the access method of the third practical application includes:

AE1 broadcasts an operation request message, where the operation request message carries position information of AE1;

after receiving the operation request message, according to the position information of AE1 and AE2, AE2 calculates a distance between AE1 and AE2 as well as an angle defined between a connection line of AE1 and AE2 and the horizontal plane;

AE2 determines whether the distance between AE1 and AE2 as well as the angle defined between the connection line of AE1 and AE2 and the horizontal plane meet a preset strategy (for example, whether the distance between AE1 and AE2 exceeds a distance threshold, and whether the angle defined between the connection line of AE1 and AE2 and the horizontal plane exceeds an angle threshold); when the preset strategy is met, AE2 transmits an operation response message to AE1;

After receiving the operation response message transmitted by the AE2, AE1 starts to access AE2, uses service resources of AE2 and execute relevant procedures requested by the operation request message.

Fourth Practical Application

Figure 7:
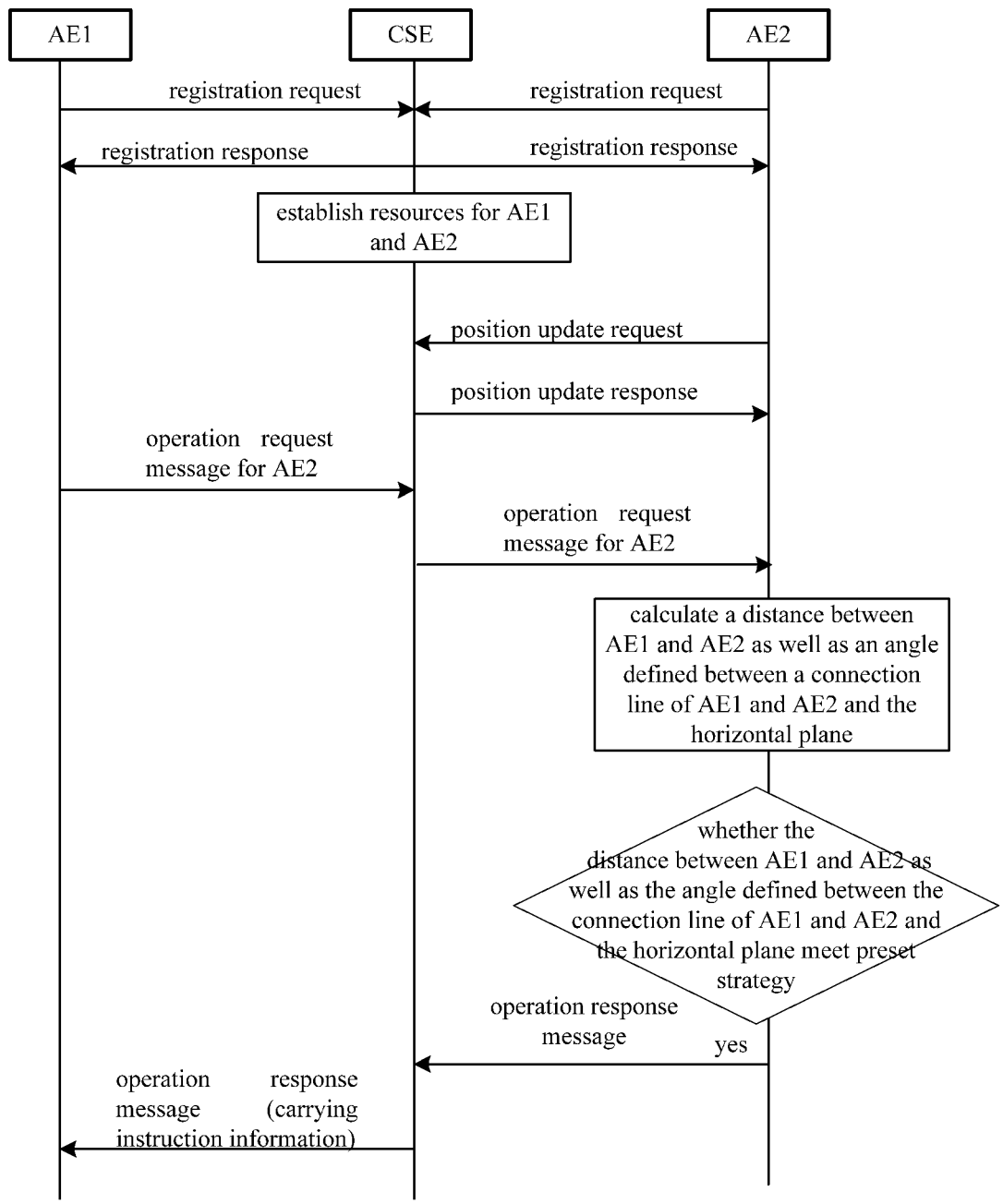
FIG. 7 is a flowchart of an access method in a fourth practical application according to some embodiments of the present disclosure.

As shown in FIG. 7, the access method of this fourth practical application includes:

an application device AE1 and a service device AE2 respectively initiate registration requests to an IoT platform CSE for initiating registration procedures at the CSE; the CSE feeds back registration responses to AE1 and AE2, respectively, so that AE1 and AE2 complete the registration; and the CSE locally establishes resources for AE1 and AE2;

AE2 initiates a position update request to CSE and transmits current position information of AE2 to CSE; after CSE records the position information of AE2, CSE feeds back a position update response to AE2, thereby completing procedures of updating position of AE2 on CSE;

when AE1 needs to use the resources of AE2, AE1 initiates an operation request message for AE2 to the CSE, where the operation request message carries position information of AE1;

CSE forwards the operation request message to AE2;

AE2 determines whether the distance between AE1 and AE2 as well as the angle defined between the connection line of AE1 and AE2 and the horizontal plane meet a preset strategy (for example, whether the distance between AE1 and AE2 exceeds a distance threshold, and whether the angle defined between the connection line of AE1 and AE2 and the horizontal plane exceeds an angle threshold); when the preset strategy is met, AE2 transmits an operation response message to CSE;

after receiving the operation response message, CSE forwards the operation response message to AE1; where instruction information may be encapsulated in the operation response message by AE2, or may be encapsulated in the operation response message by CSE.

Fifth Practical Application

Figure 8:
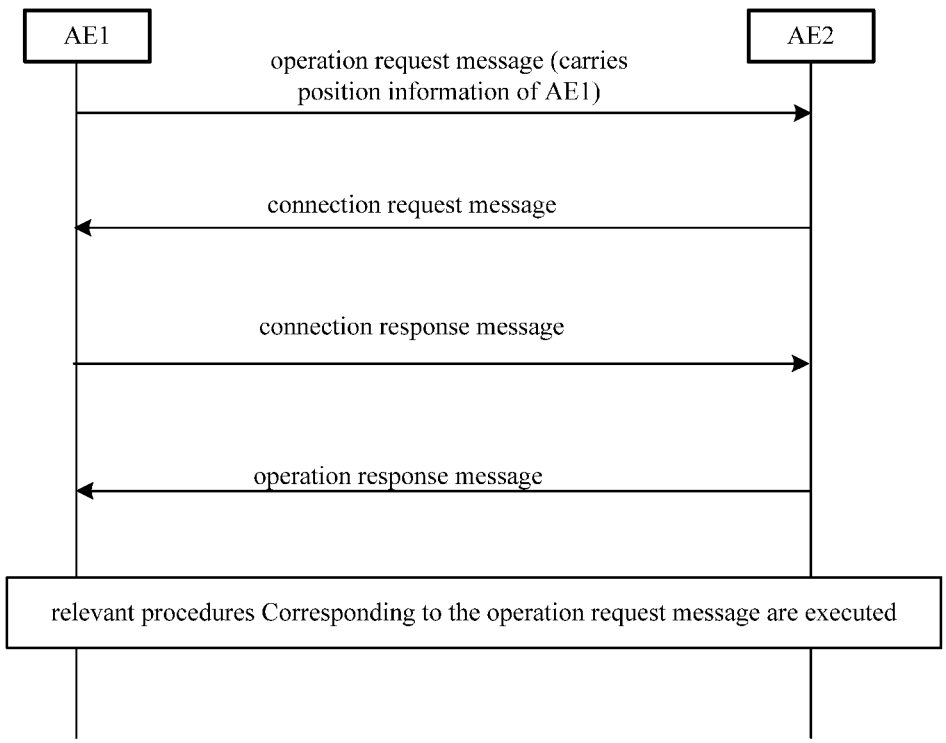
FIG. 8 is a flowchart of an access method in a fifth practical application according to some embodiments of the present disclosure.

In the fifth practical application, AE1 can access AE2 without CSE. As shown in FIG. 8, the access method of the fifth practical application includes:

AE1 broadcasts an operation request message, where the operation request message carries position information of AE1;

after receiving the operation request message, AE2 directly transmits a connection request message to AE1 according to the position information of AE1;

AE1 receives the connection request message, establishes connection with AE2 according to the connection request message, and feeds back a connection response message to AE2;

AE2 receives the connection response message, determines that AE1 establishes connection with AE2, accepts access of AE1, and feeds back the operation response message to AE1;

After AE1 accesses AE2, relevant procedures requested by the operation request message are executed by AE1.

Figure 9:
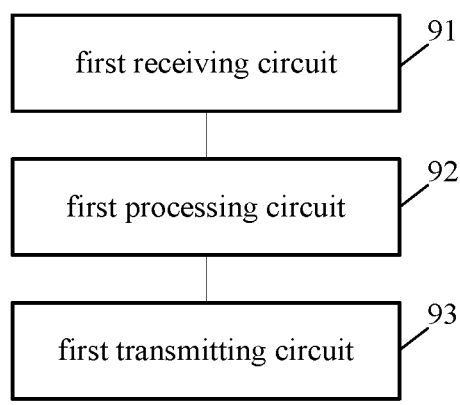
FIG. 9 is a schematic diagram of an internet of things platform according to some embodiments of the present disclosure.

According to another aspect, one embodiment of the present disclosure further provides an internet of things (IoT) platform. As shown in FIG. 9, the IoT platform includes:

a first receiving circuit 91 configured to receive an operation request message transmitted by an application device for accessing a service device; where the operation request message carries position information of the application device;

a first processing circuit 92 configured to determine whether the application device is capable of establishing connection with the service device according to the position information of the application device;

a first transmitting circuit 93 configured to, when determining that the application device is capable of establishing connection with the service device, transmit an operation response message carrying instruction information to the application device; where the instruction information is used to instruct the application device to access the service device.

Apparently, the IoT platform of this embodiment is an execution entity of the access method applied to the IoT platform in the above embodiments of the present disclosure. Thus, the technical effect that can be achieved by the access method, can also be achieved by the IoT platform of this embodiment.

Optionally, the IoT platform of this embodiment further includes:

a second receiving circuit configured to, before determining whether the application device is capable of establishing connection with the service device, receive position information of the service device transmitted by the service device.

The first processing circuit 92 specifically includes: a first processing sub-circuit configured to determine whether the application device is capable of establishing connection with the service device according to the position information of the application device and the position information of the service device.

The first processing sub-circuit is specifically configured to, according to the position information of the application device and the position information of the service device, determine a distance between the application device and the service device and/or an angle defined between a connection line of the application device and the service device and the horizontal plane; when the distance is less than or equal to a distance threshold, and/or, the angle is less than or equal to an angle threshold, determine that the application device is capable of establishing connection with the service device; otherwise, determine that the application device is not capable of establishing connection with the service device.

Optionally, the first processing circuit 92 of this embodiment further includes: a second processing sub-circuit configured to, forward the operation response message to the service device, thereby enabling the service device to determine whether the application device is capable of establishing connection with the service device according to the position information of the application device in the operation request message; receive an operation response message transmitted by the service device; when the operation response message carries instruction information for instructing the application device to access the service device, determine that the application device is capable of establishing connection with the service device.

The first transmitting circuit is specifically configured to forward the operation response message received from the service device to the application device.

Figure 10:
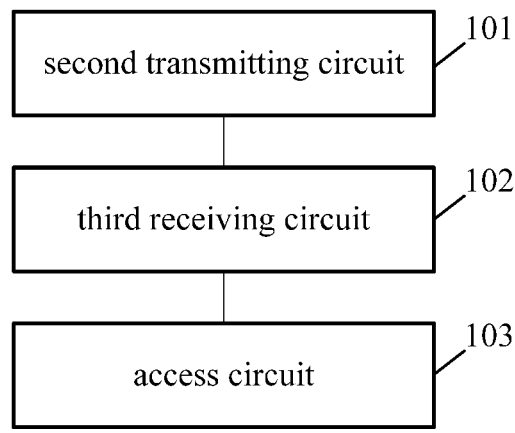
FIG. 10 is a schematic diagram of an application device according to some embodiments of the present disclosure.

In addition, one embodiment of the present disclosure further provides an application device. As shown in FIG. 10, the application device includes:

a second transmitting circuit 101 configured to, when access to the service device is required, transmit an operation request message to an internet of things (IoT) platform; where the operation request message carries position information of the application device;

a third receiving circuit 102 configured to receive an operation response message transmitted by the IoT platform;

an access circuit 103 configured to, when the operation response message carries instruction information required by the application device to access the service device, access the service device according to the instruction information.

Apparently, the application device of this embodiment is an execution entity of the access method applied to the application device in the above embodiments of the present disclosure. Thus, the technical effect that can be achieved by the access method, can also be achieved by the application device of this embodiment.

Optionally, the application device of this embodiment further includes:

a fourth receiving circuit configured to receive a connection request message which is transmitted by the service device when the service device receives the operation request message forwarded by the IoT platform;

a third transmitting circuit configured to transmit a connection response message to the service device; where the connection response message is used to indicate whether the service device successfully establishes connection with the application device according to the connection request message.

Figure 11:
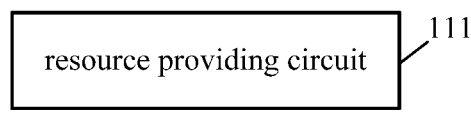
FIG. 11 is a schematic diagram of a service device according to some embodiments of the present disclosure.

In addition, one embodiment of the present disclosure further provides a service device. As shown in FIG. 11, the service device includes: a resource providing circuit 111 configured to provide local resources to the application device when the application device accesses the service device.

Apparently, the service device of this embodiment is an execution entity of the access method applied to the service device in the above embodiments of the present disclosure. Thus, the technical effect that can be achieved by the access method, can also be achieved by the service device of this embodiment.

Optionally, the service device of this embodiment further includes:

a fourth transmitting circuit configured to transmit position information of the service device to the IoT platform, thereby enabling the IoT platform to determine whether the application device is capable of establishing connection with the service device according to position information of the application device and the position information of the service device.

Optionally, the service device of this embodiment further includes:

a fifth receiving circuit configured to receive an operation request message forwarded by the IoT platform, where the operation request message carries position information of the application device;

a fifth transmitting circuit configured to transmit a connection request message to the application device according to the position information of the application device;

a sixth receiving circuit configured to receive a connection response message transmitted by the application device; where the connection response message is used to indicate whether the service device successfully establishes connection with the application device according to the position information of the application device;

a sixth transmitting circuit configured to, when the connection response message indicates that the service device successfully establishes connection with the application device according to the position information of the application device, transmit an operation response message carrying instruction information to the IoT platform; where the instruction information is used to instruct the application device to access the service device.

Optionally, the service device of this embodiment further includes:

a seventh receiving circuit configured to receive an operation request message forwarded by the IoT platform, where the operation request message carries the position information of the application device;

a second processing circuit configured to determine whether the application device is capable of establishing connection with the service device according to the position information of the application device and the position information of the service device;

a seventh transmitting circuit configured to, when the application device is capable of establishing connection with the service device, transmit an operation response message to the IoT platform; where the operation response message carries instruction information which is used to instruct the application device to access the service device.

The second processing circuit is specifically configured to, according to the position information of the application device and the position information of the service device, determine a distance between the application device and the service device and/or an angle defined between a connection line of the application device and the service device and the horizontal plane;

when the distance is less than or equal to a distance threshold, and/or, the angle is less than or equal to an angle threshold, determine that the application device is capable of establishing connection with the service device; otherwise, determine that the application device is not capable of establishing connection with the service device.

Figure 12:
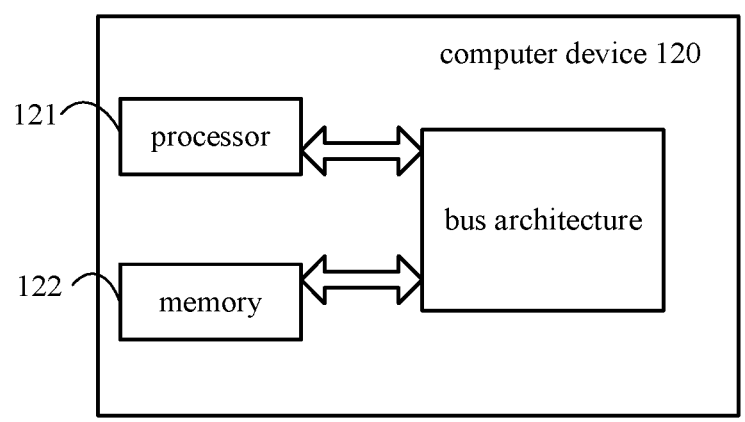
FIG. 12 is a schematic diagram of a computer device according to some embodiments of the present disclosure.

In addition, as shown in FIG. 12, one embodiment of the present disclosure further provides a computer device 120, which includes a processor 121, a memory 122, and a computer program stored on the memory 122 and executable on the processor 121.

Data exchange may be realized between the processor 121 and the memory 122 through a bus architecture. The bus architecture may include any number of interconnected buses and bridges. Specifically, various circuits of one or more processors represented by the processor 121 and memory represented by the memory 122 are linked together. The bus architecture may also link various other circuits, such as peripherals, voltage regulators, and power management circuits, as is known in the art. Thus, no further description is provided in the present disclosure. The bus interface provides an interface.

When the computer device 120 of this embodiment is applied to an IoT platform, the processor 121 reads the program of the memory to execute the following procedures:

receiving an operation request message transmitted by an application device for accessing a service device; where the operation request message carries position information of the application device;

determining whether the application device is capable of establishing connection with the service device according to the position information of the application device;

when determining that the application device is capable of establishing connection with the service device, transmitting an operation response message carrying instruction information to the application device; where the instruction information is used to instruct the application device to access the service device.

Optionally, before determining whether the application device is capable of establishing connection with the service device, the processor 121 reads the program of the memory to execute the following procedures: receiving position information of the service device transmitted by the service device.

Correspondingly, the processor 121 determines whether the application device is capable of establishing connection with the service device according to the position information of the application device and the position information of the service device in a way including: according to the position information of the application device and the position information of the service device, determining a distance between the application device and the service device and/or an angle defined between a connection line of the application device and the service device and the horizontal plane; determining whether the application device is capable of establishing connection with the service device according to the distance and/or angle.

Optionally, the processor 121 reads the program of the memory to execute the following procedures:

forwarding the operation response message to the service device, thereby enabling the service device to determine whether the application device is capable of establishing connection with the service device according to the position information of the application device in the operation request message;

receiving an operation response message transmitted by the service device; when the operation response message carries instruction information for instructing the application device to access the service device, determining that the application device is capable of establishing connection with the service device;

forwarding the operation response message received from the service device to the application device.

When the computer device 120 of this embodiment is applied to an application device, the processor 121 reads the program of the memory to execute the following procedures:

when access to the service device is required, transmitting an operation request message to an internet of things (IoT) platform; where the operation request message carries position information of the application device;

receiving an operation response message transmitted by the IoT platform;

when the operation response message carries instruction information required by the application device to access the service device, accessing the service device according to the instruction information.

Optionally, the processor 121 reads the program of the memory to execute the following procedures:

receiving a connection request message which is transmitted by the service device when the service device receives the operation request message forwarded by the IoT platform;

transmitting a connection response message to the service device; where the connection response message is used to indicate whether the service device successfully establishes connection with the application device according to the connection request message.

In addition, when the computer device 120 of this embodiment is applied to a service device, the processor 121 reads the program of the memory to execute the following procedures: providing local resources to the application device when the application device accesses the service device.

Optionally, the processor 121 reads the program of the memory to execute the following procedures:

transmitting position information of the service device to the IoT platform, thereby enabling the IoT platform to determine whether the application device is capable of establishing connection with the service device according to position information of the application device and the position information of the service device.

Optionally, the processor 121 reads the program of the memory to execute the following procedures:

receiving an operation request message forwarded by the IoT platform, where the operation request message carries position information of the application device;

transmitting a connection request message to the application device according to the position information of the application device;

receiving a connection response message transmitted by the application device; where the connection response message is used to indicate whether the service device successfully establishes connection with the application device according to the position information of the application device;

when the connection response message indicates that the service device successfully establishes connection with the application device according to the position information of the application device, transmitting an operation response message carrying instruction information to the IoT platform; where the instruction information is used to instruct the application device to access the service device.

Optionally, the processor 121 reads the program of the memory to execute the following procedures:

receiving an operation request message forwarded by the IoT platform, where the operation request message carries the position information of the application device;

determining whether the application device is capable of establishing connection with the service device according to the position information of the application device and the position information of the service device;

when the application device is capable of establishing connection with the service device, transmitting an operation response message to the IoT platform; where the operation response message carries instruction information which is used to instruct the application device to access the service device.

The determining whether the application device is capable of establishing connection with the service device according to the position information of the application device and the position information of the service device, includes:

according to the position information of the application device and the position information of the service device, determining a distance between the application device and the service device and/or an angle defined between a connection line of the application device and the service device and the horizontal plane;

when the distance is less than or equal to a distance threshold, and/or, the angle is less than or equal to an angle threshold, determining that the application device is capable of establishing connection with the service device; otherwise, determining that the application device is not capable of establishing connection with the service device.

In addition, one embodiment of the present disclosure further provides a computer-readable storage medium including a computer program stored thereon.

When the computer-readable storage medium of this embodiment is applied to an IoT platform, the computer program stored in the computer-readable storage medium is executed by a processor to execute the following procedures:

receiving an operation request message transmitted by an application device for accessing a service device; where the operation request message carries position information of the application device;

determining whether the application device is capable of establishing connection with the service device according to the position information of the application device;

when determining that the application device is capable of establishing connection with the service device, transmitting an operation response message carrying instruction information to the application device; where the instruction information is used to instruct the application device to access the service device.

Optionally, before determining whether the application device is capable of establishing connection with the service device, the computer program stored in the computer-readable storage medium is executed by the processor to execute the following procedures: receiving position information of the service device transmitted by the service device.

When determining whether the application device is capable of establishing connection with the service device according to the position information of the application device, whether the application device is capable of establishing connection with the service device is determined according to the position information of the application device and the position information of the service device in a way including:

according to the position information of the application device and the position information of the service device, determining a distance between the application device and the service device and/or an angle defined between a connection line of the application device and the service device and the horizontal plane;

when the distance is less than or equal to a distance threshold, and/or, the angle is less than or equal to an angle threshold, determining that the application device is capable of establishing connection with the service device; otherwise, determining that the application device is not capable of establishing connection with the service device.

Optionally, the computer program stored in the computer-readable storage medium is executed by the processor to execute the following procedures:

forwarding the operation response message to the service device, thereby enabling the service device to determine whether the application device is capable of establishing connection with the service device according to the position information of the application device in the operation request message;

receiving an operation response message transmitted by the service device; when the operation response message carries instruction information for instructing the application device to access the service device, determining that the application device is capable of establishing connection with the service device;

forwarding the operation response message received from the service device to the application device.

In addition, when the computer-readable storage medium of this embodiment is applied to an application device, the computer program stored in the computer-readable storage medium is executed by a processor to execute the following procedures:

when access to the service device is required, transmitting an operation request message to an internet of things (IoT) platform; where the operation request message carries position information of the application device;

receiving an operation response message transmitted by the IoT platform;

when the operation response message carries instruction information required by the application device to access the service device, accessing the service device according to the instruction information.

Optionally, the computer program stored in the computer-readable storage medium is executed by the processor to execute the following procedures:

receiving a connection request message which is transmitted by the service device when the service device receives the operation request message forwarded by the IoT platform;

transmitting a connection response message to the service device; where the connection response message is used to indicate whether the service device successfully establishes connection with the application device according to the connection request message.

In addition, when the computer-readable storage medium of this embodiment is applied to a server device, the computer program stored in the computer-readable storage medium is executed by a processor to execute the following procedures: providing local resources to the application device when the application device accesses the service device.

Optionally, the computer program stored in the computer-readable storage medium is executed by the processor to execute the following procedures:

transmitting position information of the service device to the IoT platform, thereby enabling the IoT platform to determine whether the application device is capable of establishing connection with the service device according to position information of the application device and the position information of the service device.

Optionally, the computer program stored in the computer-readable storage medium is executed by the processor to execute the following procedures:

receiving an operation request message forwarded by the IoT platform, where the operation request message carries position information of the application device;

transmitting a connection request message to the application device according to the position information of the application device;

receiving a connection response message transmitted by the application device; where the connection response message is used to indicate whether the service device successfully establishes connection with the application device according to the position information of the application device;

when the connection response message indicates that the service device successfully establishes connection with the application device according to the position information of the application device, transmitting an operation response message carrying instruction information to the IoT platform; where the instruction information is used to instruct the application device to access the service device.

Optionally, the computer program stored in the computer-readable storage medium is executed by the processor to execute the following procedures:

receiving an operation request message forwarded by the IoT platform, where the operation request message carries the position information of the application device;

determining whether the application device is capable of establishing connection with the service device according to the position information of the application device and the position information of the service device;

when the application device is capable of establishing connection with the service device, transmitting an operation response message to the IoT platform; where the operation response message carries instruction information which is used to instruct the application device to access the service device.

The determining whether the application device is capable of establishing connection with the service device according to the position information of the application device and the position information of the service device, includes:

according to the position information of the application device and the position information of the service device, determining a distance between the application device and the service device and/or an angle defined between a connection line of the application device and the service device and the horizontal plane;

when the distance is less than or equal to a distance threshold, and/or, the angle is less than or equal to an angle threshold, determining that the application device is capable of establishing connection with the service device; otherwise, determining that the application device is not capable of establishing connection with the service device.

The above are merely the optional embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

Unless otherwise defined, any technical or scientific terms used herein shall have the common meaning understood by a person of ordinary skills. Such words as "comprise" or "comprising" means that an element or an object preceding the word includes an element or an object listed after the word and its equivalent, without excluding other elements or objects.

The invention claimed is:

1. An access method applied to an internet of things (IoT) platform, comprising: receiving an operation request message transmitted by an application device for accessing a service device; wherein the operation request message carries position information of the application device;

determining whether the application device is capable of establishing connection with the service device according to the position information of the application device;

upon determining that the application device is capable of establishing connection with the service device, transmitting an operation response message carrying instruction information to the application device; wherein the instruction information is used to instruct the application device to access the service device;

wherein before the determining whether the application device is capable of establishing connection with the service device, the method further includes:

receiving position information of the service device transmitted by the service device;

the determining whether the application device is capable of establishing connection with the service device according to the position information of the application device, includes:

determining whether the application device is capable of establishing connection with the service device according to the position information of the application device and the position information of the service device;

wherein the determining whether the application device is capable of establishing connection with the service device according to the position information of the application device and the position information of the service device, includes:

according to the position information of the application device and the position information of the service device, determining a distance between the application device and the service device and an angle defined between a connection line of the application device and the service device and a preset axis;

upon determining the distance is less than or equal to a distance threshold, and the angle is less than or equal to an angle threshold, determining that the application device is capable of establishing connection with the service device; otherwise, determining that the application device is not capable of establishing connection with the service device.

2. An access method applied to a service device, comprising:

providing local resources to an application device after the application device accesses the service device;

wherein the access method further includes:

receiving an operation request message forwarded by an internet of things (IoT) platform; wherein the operation request message carries the position information of the application device;

determining whether the application device is capable of establishing connection with the service device according to the position information of the application device and the position information of the service device;

upon determining the application device is capable of establishing connection with the service device, transmitting an operation response message to the IoT platform; wherein the operation response message carries instruction information which is used to instruct the application device to access the service device;

wherein the determining whether the application device is capable of establishing connection with the service device according to the position information of the application device and the position information of the service device, includes:

according to the position information of the application device and the position information of the service device, determining a distance between the application device and the service device and an angle defined between a connection line of the application device and the service device and a horizontal plane;

upon determining the distance is less than or equal to a distance threshold, and the angle is less than or equal to an angle threshold, determining that the application device is capable of establishing connection with the service device; otherwise, determining that the application device is not capable of establishing connection with the service device.

3. The access method according to claim 2, wherein the access method further includes:
   transmitting position information of the service device to an internet of things (IoT) platform, thereby enabling the IoT platform to determine whether the application device is capable of establishing connection with the service device according to position information of the application device and the position information of the service device.

4. The access method according to claim 2, wherein the access method further includes:
   receiving an operation request message forwarded by an internet of things (IoT) platform; wherein the operation request message carries position information of the application device;
   transmitting a connection request message to the application device according to the position information of the application device;
   receiving a connection response message transmitted by the application device;
   wherein the connection response message is used to indicate whether the service device successfully establishes connection with the application device according to the position information of the application device;
   upon determining the connection response message indicates that the service device successfully establishes connection with the application device according to the position information of the application device, transmitting an operation response message carrying instruction information to the IoT platform; wherein the instruction information is used to instruct the application device to access the service device.

5. A service device for performing the access method according to claim 2, comprising:
   a resource providing circuit configured to provide local resources to an application device when the application device accesses the service device;
   wherein the service device further includes:
   a seventh receiving circuit configured to receive an operation request message forwarded by an internet of things (IoT) platform; wherein the operation request message carries the position information of the application device;
   a second processing circuit configured to determine whether the application device is capable of establishing connection with the service device according to the position information of the application device and the position information of the service device;
   a seventh transmitting circuit configured to, when the application device is capable of establishing connection with the service device, transmit an operation response message to an internet of things (IoT) platform; wherein the operation response message carries instruction information which is used to instruct the application device to access the service device;
   wherein the second processing circuit is configured to, according to the position information of the application device and the position information of the service device, determine a distance between the application device and the service device and an angle defined between a connection line of the application device and the service device and the horizontal plane;
   when the distance is less than or equal to a distance threshold, and the angle is less than or equal to an angle threshold, determine that the application device is capable of establishing connection with the service device; otherwise, determine that the application device is not capable of establishing connection with the service device.

6. The service device according to claim 5, wherein the service device further includes:
   a fourth transmitting circuit configured to transmit position information of the service device to an internet of things (IoT) platform, thereby enabling the IoT platform to determine whether the application device is capable of establishing connection with the service device according to position information of the application device and the position information of the service device;
   a fifth receiving circuit configured to receive an operation request message forwarded by an internet of things (IoT) platform; wherein the operation request message carries position information of the application device;
   a fifth transmitting circuit configured to transmit a connection request message to the application device according to the position information of the application device;
   a sixth receiving circuit configured to receive a connection response message transmitted by the application device; wherein the connection response message is used to indicate whether the service device successfully establishes connection with the application device according to the position information of the application device;
   a sixth transmitting circuit configured to, when the connection response message indicates that the service device successfully establishes connection with the application device according to the position information of the application device, transmitting an operation response message carrying instruction information to the IoT platform; wherein the instruction information is used to instruct the application device to access the service device.

7. An internet of things (IoT) platform, comprising:
   a first receiving circuit configured to receive an operation request message transmitted by an application device for accessing a service device; wherein the operation request message carries position information of the application device;
   a first processing circuit configured to determine whether the application device is capable of establishing connection with the service device according to the position information of the application device;
   a first transmitting circuit configured to, when determining that the application device is capable of establishing connection with the service device, transmit an operation response message carrying instruction information to the application device; wherein the instruction information is used to instruct the application device to access the service device;
   wherein the IoT platform further includes: a second receiving circuit configured to, before determining whether the application device is capable of establishing connection with the service device, receive position information of the service device transmitted by the service device;

the first processing circuit includes: a first processing sub-circuit configured to determine whether the application device is capable of establishing connection with the service device according to the position information of the application device and the position information of the service device;

wherein the first processing sub-circuit is specifically configured to, according to the position information of the application device and the position information of the service device, determine a distance between the application device and the service device and an angle defined between a connection line of the application device and the service device and a preset axis; when the distance is less than or equal to a distance threshold, and the angle is less than or equal to an angle threshold, determine that the application device is capable of establishing connection with the service device; otherwise, determining that the application device is not capable of establishing connection with the service device.

8. The IoT platform according to claim 7, wherein the first processing circuit further includes a second processing sub-circuit configured to, forward the operation response message to the service device, thereby enabling the service device to determine whether the application device is capable of establishing connection with the service device according to the position information of the application device in the operation request message;

receive an operation response message transmitted by the service device; when the operation response message carries instruction information for instructing the application device to access the service device, determine that the application device is capable of establishing connection with the service device;

wherein the first transmitting circuit is configured to forward the operation response message received from the service device to the application device.

* * * * *